(12) United States Patent
Rajagopalan et al.

(10) Patent No.: US 7,693,046 B2
(45) Date of Patent: Apr. 6, 2010

(54) METHOD AND APPARATUS FOR MAINTAINING NETWORK CONNECTIVITY VIA LABEL SWITCHED PATH(S)

(75) Inventors: Balaji Rajagopalan, Sunnyvale, CA (US); Man-Tung T. Hsiao, Cupertino, CA (US); Vivek Venkatraman, Santa Clara, CA (US); Ravindra Sunkad, Pleasanton, CA (US); Ramkumar Krishnamoorthy, Cupertino, CA (US)

(73) Assignee: Tellabs San Jose, Inc., Naperville, IL (US)

( * ) Notice: Subject to any disclaimer, the term of this patent is extended or adjusted under 35 U.S.C. 154(b) by 573 days.

(21) Appl. No.: 11/447,693

(22) Filed: Jun. 5, 2006

(65) Prior Publication Data

US 2007/0280242 A1    Dec. 6, 2007

(51) Int. Cl.
H04L 12/26    (2006.01)
H04L 12/28    (2006.01)

(52) U.S. Cl. .................. 370/216; 370/241; 370/401
(58) Field of Classification Search ......... 370/216–228, 370/241–245, 252, 392, 400, 401
See application file for complete search history.

(56) References Cited

U.S. PATENT DOCUMENTS

| | | | |
|---|---|---|---|
| 6,778,492 B2 | 8/2004 | Charny et al. | |
| 6,895,441 B1 | 5/2005 | Shabtay et al. | |
| 6,904,018 B2 | 6/2005 | Lee et al. | |
| 7,120,151 B1* | 10/2006 | Ginjpalli et al. | 370/395.1 |
| 2004/0190443 A1* | 9/2004 | Kitamori et al. | 370/222 |
| 2005/0111351 A1* | 5/2005 | Shen | 370/217 |
| 2005/0169182 A1* | 8/2005 | Klink | 370/236.2 |
| 2005/0276217 A1* | 12/2005 | Gadgil et al. | 370/225 |
| 2006/0268682 A1* | 11/2006 | Vasseur | 370/216 |
| 2007/0217331 A1* | 9/2007 | Khanna et al. | 370/224 |
| 2008/0304494 A1* | 12/2008 | Yokoyama | 370/400 |

* cited by examiner

Primary Examiner—Hong Cho
(74) Attorney, Agent, or Firm—Hamilton Brook Smith & Reynolds, PC

(57) ABSTRACT

A method or corresponding apparatus in an exemplary embodiment of the present invention monitors an operational status of network links and retrieves or receives the operational status. The operational status is stored (e.g., within 50 msec) on an ongoing basis. The operational status corresponds to an operational LSP from among a primary LSP and secondary LSP(s) used to service traffic via the network links to maintain network connectivity via the LSPs. The secondary LSP(s) may be either a bypass LSP or a backup LSP, where each LSP is Fast Re-route (FRR) enabled. Further, correspondence between the primary LSP, secondary LSP(s), and the network links may be tracked. In order to deliver network traffic via the operational LSP known to service traffic between the source and destination, a link identifier may be used. The link identifier is determined from the source and destination information within the network traffic.

20 Claims, 13 Drawing Sheets

METHOD AND APPARATUS FOR MAINTAINING NETWORK CONNECTIVITY VIA LABEL SWITCHED PATH(S)

BACKGROUND OF THE INVENTION

As networks such as the Internet grow, networking technology evolves. One such networking technology is Multi-Protocol Label Services (MPLS). Within MPLS, Label Switched Paths (LSPs) may be employed for carrying data between network nodes. If a network link becomes unavailable, delays due to rerouting or otherwise finding an available link substitute are caused within the network resulting in efficiency losses. Despite these delays, LSPs are still an effective way to transmit data between network nodes. Thus, LSPs are used in industry today for carrying data traffic flows between network nodes.

SUMMARY OF THE INVENTION

A method or corresponding apparatus in an exemplary embodiment of the present invention monitors an operational status of network links and stores the operational status on an ongoing or continuous basis. The operational status corresponds to an operational LSP from among a primary LSP and secondary LSP(s). This operational LSP may service traffic via the network links to maintain network connectivity.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

A method or corresponding apparatus in an exemplary embodiment of the present invention monitors an operational status of network links and either automatically updates or retrieves the operational status. The operational status is stored, within 50 msec in some embodiments, on an ongoing basis. Further, in an example embodiment, the operational status corresponds to an operational LSP from among a primary LSP and at least one secondary LSP. The operational LSP may service traffic via network links to maintain network connectivity via the LSPs.

In another embodiment of the present invention, network traffic may be delivered via an operational LSP known to service traffic between the source and destination, by using a link identifier. The link identifier may be determined from the source and destination information within the network traffic.

In yet another embodiment of the present invention, secondary LSP(s) may be either a bypass LSP or a backup LSP, where each LSP is Fast Re-route (FRR) enabled. Further, correspondence between the primary LSP, secondary LSP(s), and the network links may be tracked.

In still yet another embodiment of the present invention, memory may be used for storing network information. The memory may be accessible to retrieve traffic forwarding, classification, and network link operational status information. This memory may be a first memory containing forwarding and classification information and a second memory containing network link operational status information.

Figure 1:
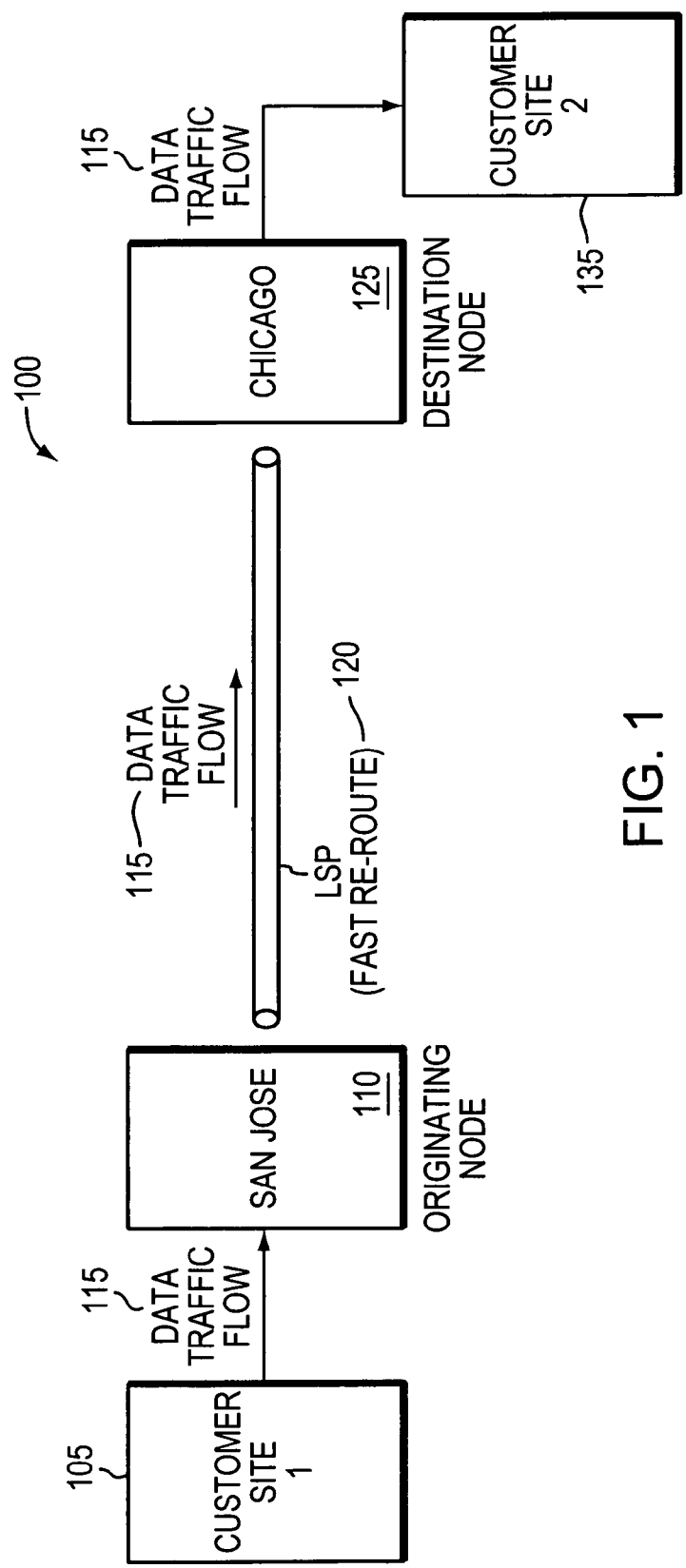
FIG. 1 is a network diagram depicting network nodes, connected via a Label Switched Path (LSP), communicating network data using an embodiment of the present invention.

FIG. 1 is a high level network diagram of a network 100 depicting interconnected network nodes communicating data. In this network 100, a first customer site 105 is connected to an originating node 110, such as a central office with optical networking equipment (not shown). Using this connection, the originating node 110 obtains a data traffic flow 115 and subsequently sends the data traffic flow 115, using a FRR enabled LSP 120, to a destination node 125, such as a central office with optical networking equipment (not shown) compatible with the networking equipment in the originating node 110. After receiving the data traffic flow 115, the destination node 125, using a connection to a second customer site 135, sends the data traffic flow 115 to the second customer site 135. In this way, the first customer site 105 transmits data traffic flow 115 over the LSP 120 to the second customer site 135.

It should be understood that there may be several nodes (not shown) between the originating node 110 and destination node 125.

Figure 2A:
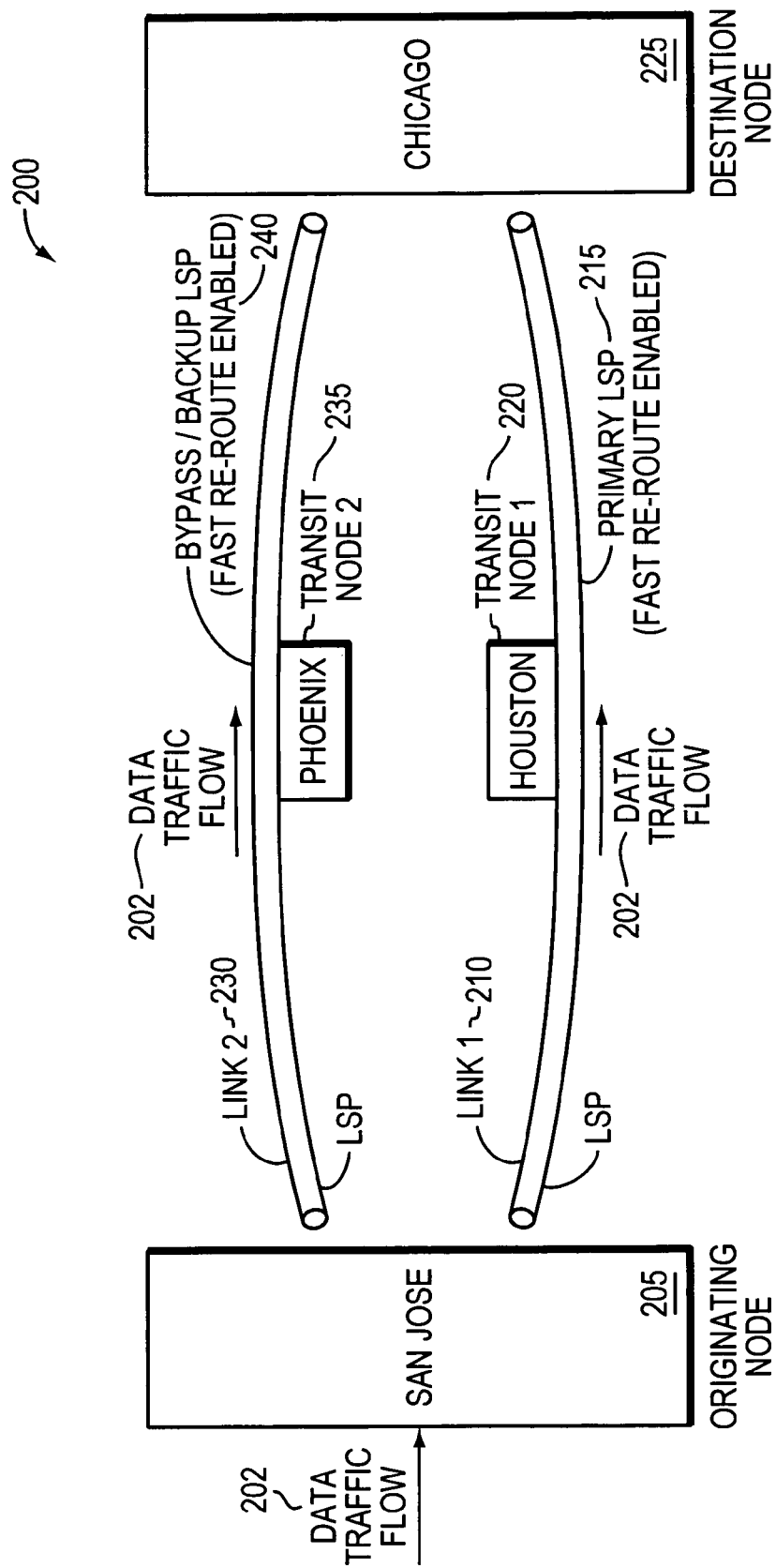
FIG. 2A is a network diagram depicting network nodes, connected via a primary LSP and a secondary LSP, communicating data using an embodiment of the present invention.

FIG. 2A is a network diagram depicting a network 200 transmitting traffic flow data over a LSP. In this network 200, an originating node 205 receives a data traffic flow 202 for transmitting to a destination node. The originating node 205 may use a first link 210 on a FRR enabled primary LSP 215 to transmit the data traffic flow 202, via a first transit node 220, to a destination node 225. Alternatively, the originating node 205 may use a second link 230 on which a bypass/backup LSP 240 traverses to transmit the data traffic flow 202, via a second transit node 235, to the destination node 225.

In this network 200, the first link 210 supporting the primary LSP 215, if available, is the first choice for the originating node 205 to transmit a data traffic flow 202 to the destination node 225. However, the bypass/backup LSP 240 may be used as an alternative way to transmit the data traffic flow 202 to the destination node 225. For example, the bypass/backup LSP 240 may be used instead of the primary LSP 215 if the primary LSP 215 is unavailable (e.g., in a non-operational state). It is useful to note that transmission of the data traffic flow 202 does not require use of the transit nodes 220, 235. Transit nodes are depicted as an example of multiple network nodes via which the LSPs 215, 240 traverse the network 200.

Figure 2B:
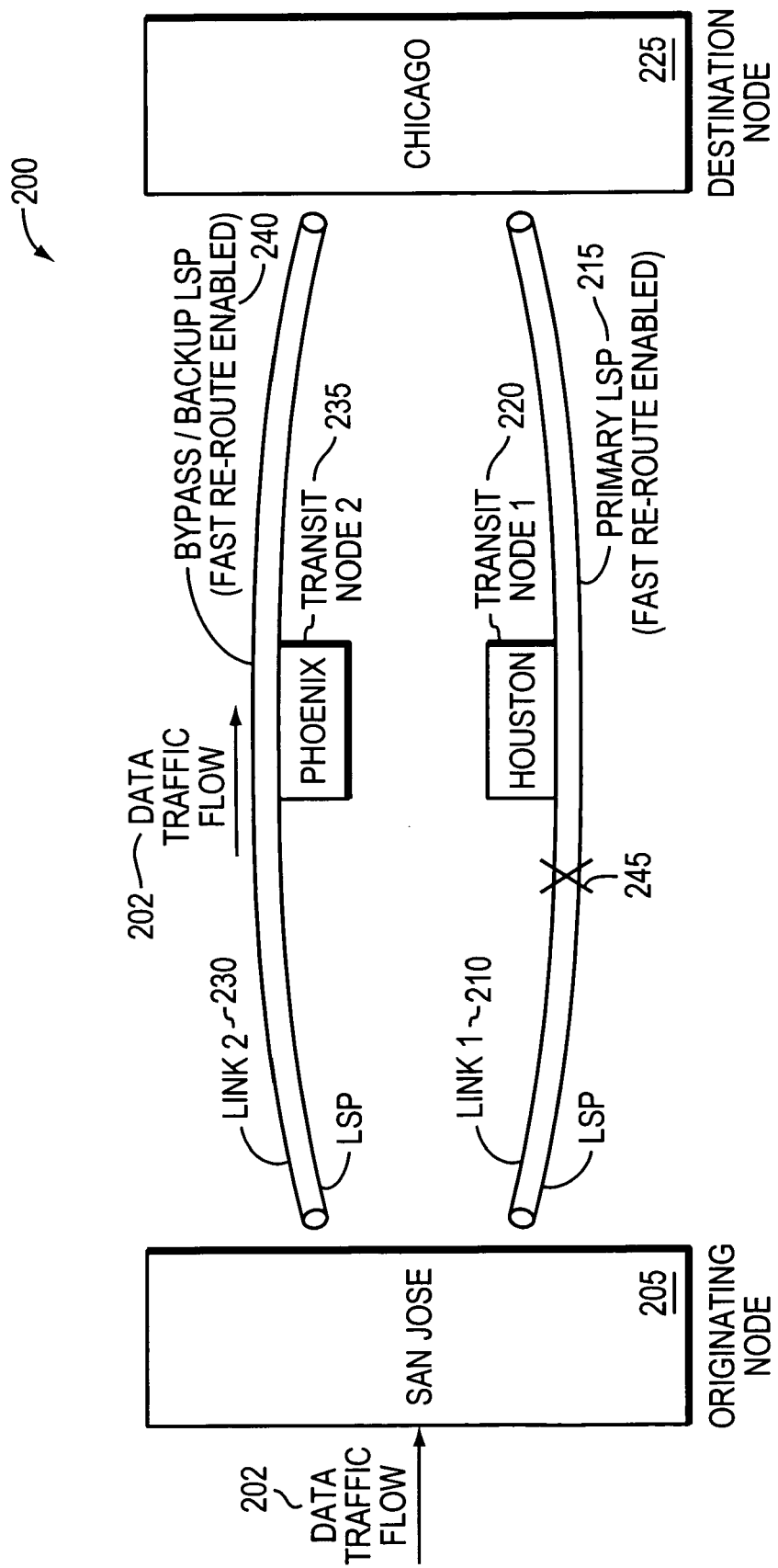
FIG. 2B is a network diagram depicting an unavailable primary LSP within a network.

FIG. 2B is a network diagram 200 illustrating the data traffic flow 202 in a situation where the primary LSP 215 is unavailable. The originating node 205 receives the data traffic flow 202. After receiving the data traffic flow 202, the originating node 205 determines whether to use the first link 210 supporting the primary LSP 215 or the second link 230 supporting the bypass/backup LSP 240 based on an operational status (not shown) of each respective LSP. In this example, the first link 210 supporting the primary LSP 215 is unavailable for transmitting because of a link cut 245 or other type of network fault known in the art. Thus, the originating node 205 selects the second link 230 for transmission of the data traffic flow 202, and the originating node 205 transmits data traffic flow 202 to the destination node 225. In this example, the first link 210 is not considered as a transmission option because the originating node 205 is aware that the first link 210 is unavailable. In this way, the originating node 205 transmits the data traffic flow 202 to the destination node 225 without any undue delay. Through the use of the fast reroute, the transmission of the data traffic flow 202 is typically performed within 50 msec, which matches failover speeds of other network protocols, such as Synchronous Optical Network (SONET), but unobtainable in existing LSP networks. It is useful to note that the originating node 205 may only be aware of the available LSP, so this example embodiment has no scalability limitations. That is, this example embodiment operates at a switchover rate within 50 msec regardless of the number of LSPs on a particular network or network node.

Figure 3A:
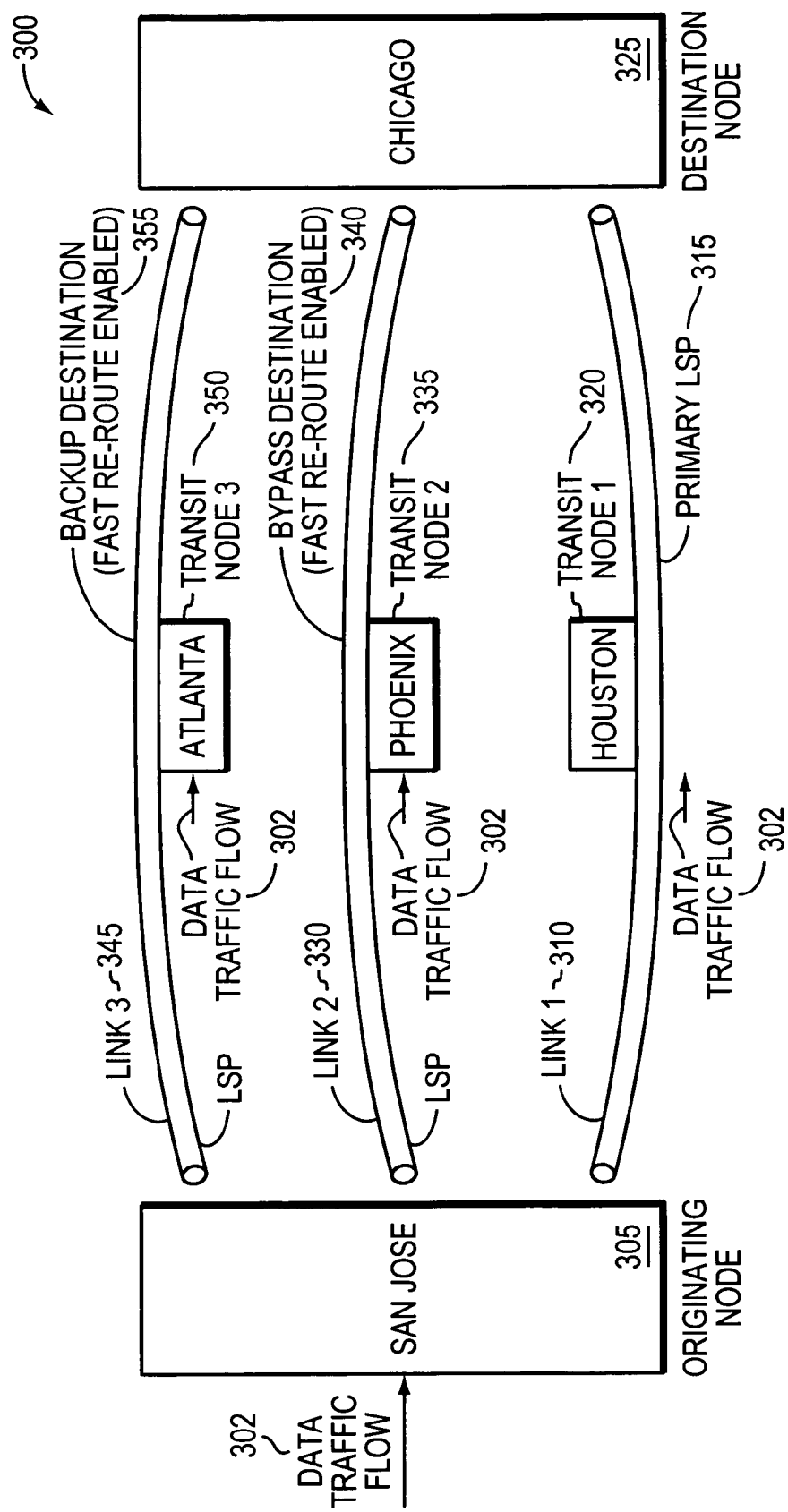
FIG. 3A is a network diagram depicting network nodes, connected via primary LSP and multiple secondary LSPs, communicating data using an embodiment of the present invention.

FIG. 3A is a network 300 depicting transmission of traffic flow data 302 over a LSP. In this network 300, an originating node 305 is connected to multiple FRR enabled LSPs 315, 340, 355. In particular, a first link 310 on a primary LSP 315 may carry the data traffic flow 302 over a first transit node 320 to a destination node 325. In addition to first link 310, via a second link 330, a FRR enabled bypass destination LSP 340, may carry the data traffic flow 302 to the destination node 325 though a second transit node 335. Further, via a third link 345, a backup destination LSP 355 may carry the data traffic flow 302 to the destination node 325 though a third transit node 350.

In this network 300, the primary LSP 315 may be the fastest way for transmitting the data traffic flow 302 from the originating node 305 to the destination node 325. If the primary LSP 315 is unavailable, the bypass destination LSP 340 or the backup destination LSP 355 may be used as alternative paths to carry the data traffic flow 302 from the originating node 305 to the destination node 325. A typical reason for using the bypass destination LSP 340 or the backup destination LSP 355 instead of the primary LSP 315 is if the primary LSP 315 is unavailable (e.g., not enough bandwidth or failure). It is useful to note that the bypass destination LSP 340 or the backup destination LSP 355 may be used for more than one LSP traversing the same network node (e.g., the first transit node 320) even if there are different destinations nodes (e.g. Chicago, New York, or Boston).

Figure 3B:
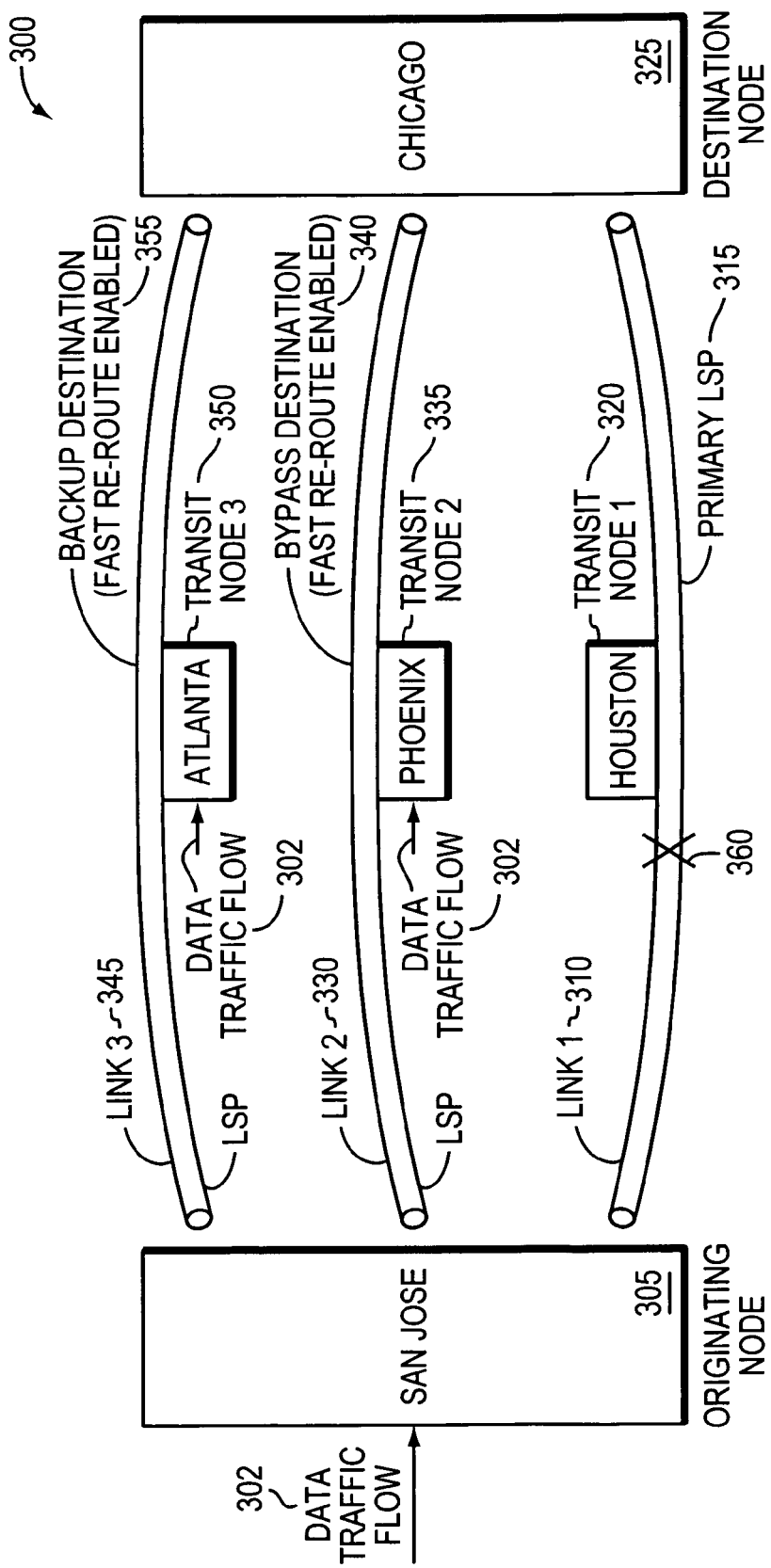
FIG. 3B is a network diagram of a network including an unavailable primary LSP within a network.

FIG. 3B depicts a network 300 for transmitting a data traffic flow 302 in which a LSP becomes unavailable for transmission. The originating node 305 receives data traffic flow 302 to transmit to the destination node 325. The originating node 305 determines whether to use the first link 310, second link 330, or third link 345 based on an operational status (not shown) of each respective link. In this case, the first link 310 is unavailable because of a link cut 360 or other network fault. After the link cut 360 is detected, the originating node 305 determines whether to use the second link 330 or the third link 345 to transmit the data traffic flow 302 to the destination node 325. Next, the originating node 305 transmits the data traffic flow 302 without attempting to use the first link 310 because the originating node 305 is aware that, the first link 310 is unavailable. In this way, the originating node 305 transmits the data traffic flow 302 to the destination node 325 without undue delay.

Figure 3C:
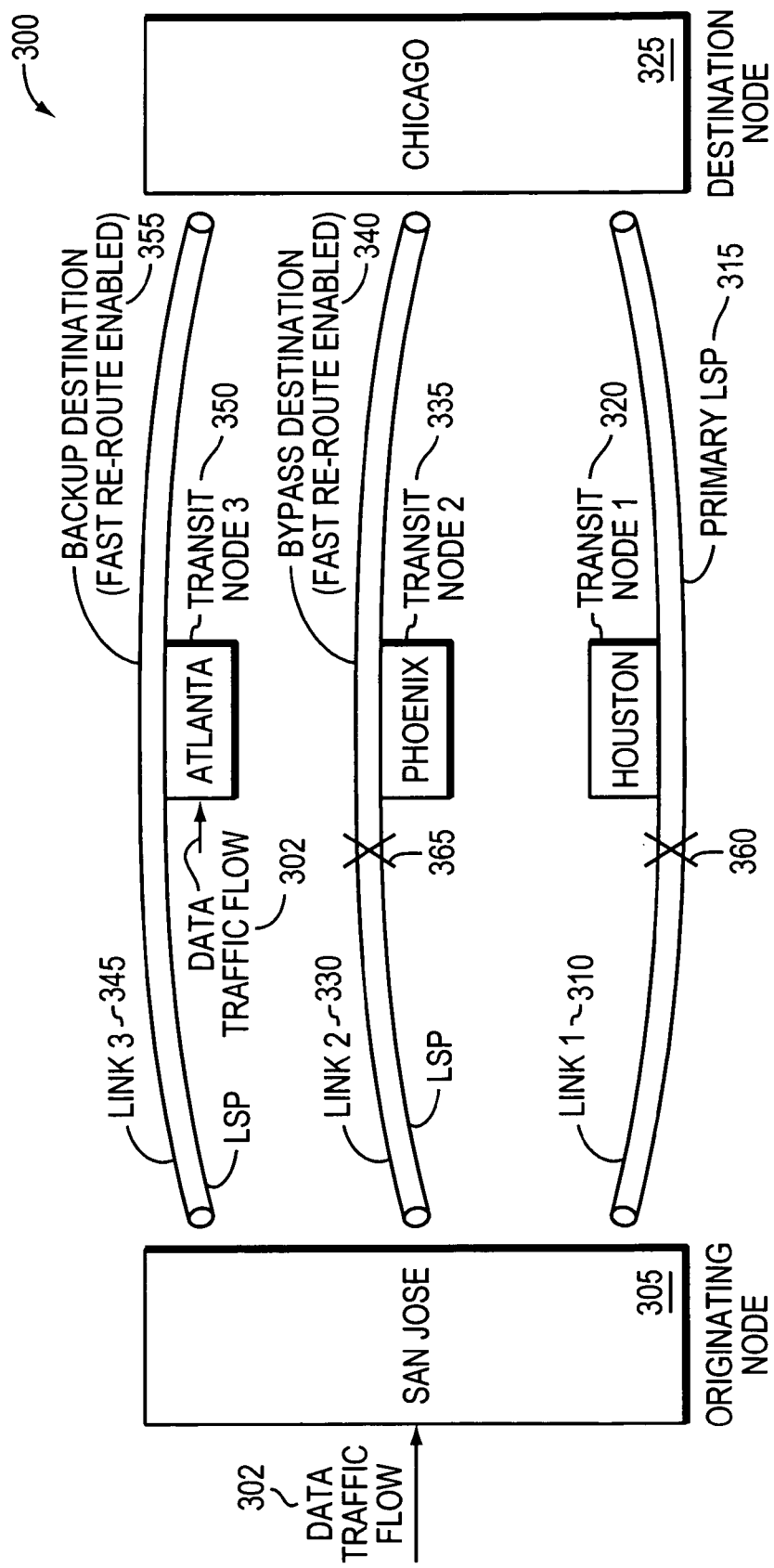
FIG. 3C is a network diagram depicting an unavailable primary LSP and unavailable secondary LSP within a network.

FIG. 3C is a network diagram depicting a network 300 for transmitting data traffic flow 302. In this example, network 300, more than one LSP is unavailable. The originating node 305 receives the data traffic flow 302 to transmit to the destination node 325. The originating node 305 determines whether to use the first link 310, the second link 330, or the third link 345 based on an operational status (not shown) of each respective link. In this case, the first link 310 and the second link 330 are unavailable to carry the data traffic flow 302 due to link cuts 360 and 365, or other network fault respectively. Therefore, in this example network 300, the originating node 305 determines the only available network link is the third link 345 since the originating node 305 is aware that the first link 310 and the second link 330 are unavailable. Next, the originating node 305 transmits the data traffic flow 302 on the third link 345 without attempting to use either the first link 310 or the second link 330. In this way, the originating node 305 transmits the data traffic flow 302 to the destination node 325 without delay due to an unavailable network link.

Figure 4:
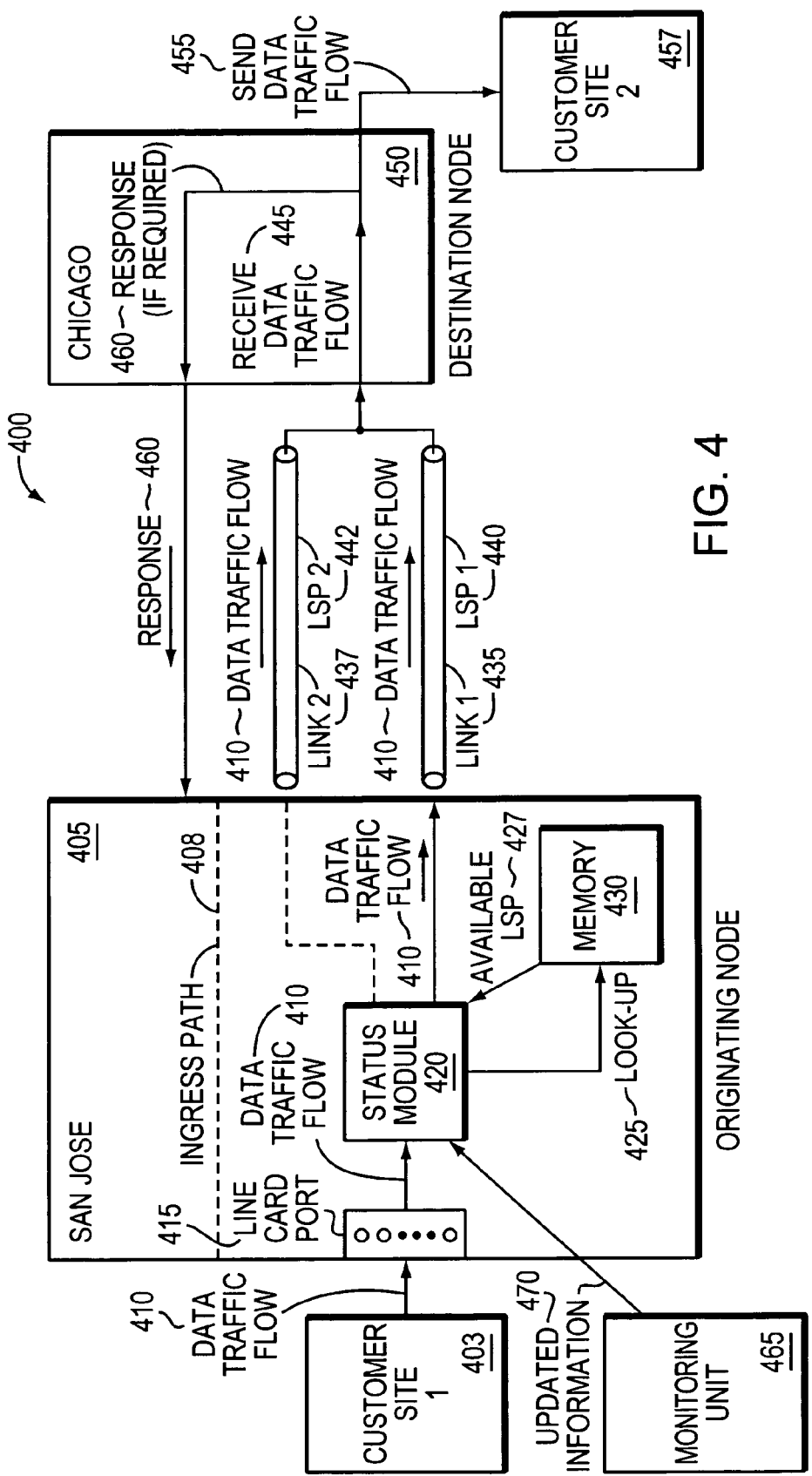
FIG. 4 is a schematic diagram of a network node using an embodiment of the present invention to transmit data over a LSP.

FIG. 4 is a schematic diagram of a network 400 showing an originating node 405 using an embodiment of the present invention to transmit data traffic flow 410 over a first LSP 440 or a second LSP 442 to a destination node 450. In this network 400, a first customer site 403 is connected to the originating node 405. The first customer site 403 sends the data traffic flow 410 to a port 415 on a line card 408 located in the originating node 405. Once the line card 408 receives the data traffic flow 410, where the data traffic flow 410 includes source and destination information, the line card determines which LSP to use to transmit the data traffic flow 410 to the destination node 450. In one embodiment, the data traffic flow 410 is forwarded to a status module 420. The status module 420, using data within the data traffic flow 410, performs a look-up 425 in a memory 430. The look-up 425 provides an available LSP 427 to use for transmitting the data traffic flow 410 to the destination node 450. The memory 430 may be Content-Addressable Memory or other suitable memory. It should be understood that the memory 430 may be suitably fast enough to support high speed data communications, such as 10 Gbit/sec communication rates.

Once the available LSP is selected, the status module 420 sends the data traffic flow 410 to the appropriate link on the LSP (e.g., a first link 435 of a first LSP 440 or a second link 437 of a second LSP 442) to the destination node 450. The destination node 450, in turn, provides a response 460 (if required) to the originating node 405. Further, the destination node 450 sends the data traffic flow 455 to a second customer site 457. In this way, the data traffic flow 410 is transmitted over a LSP from the first customer site 403 to the second customer site 457.

Figure 5A:
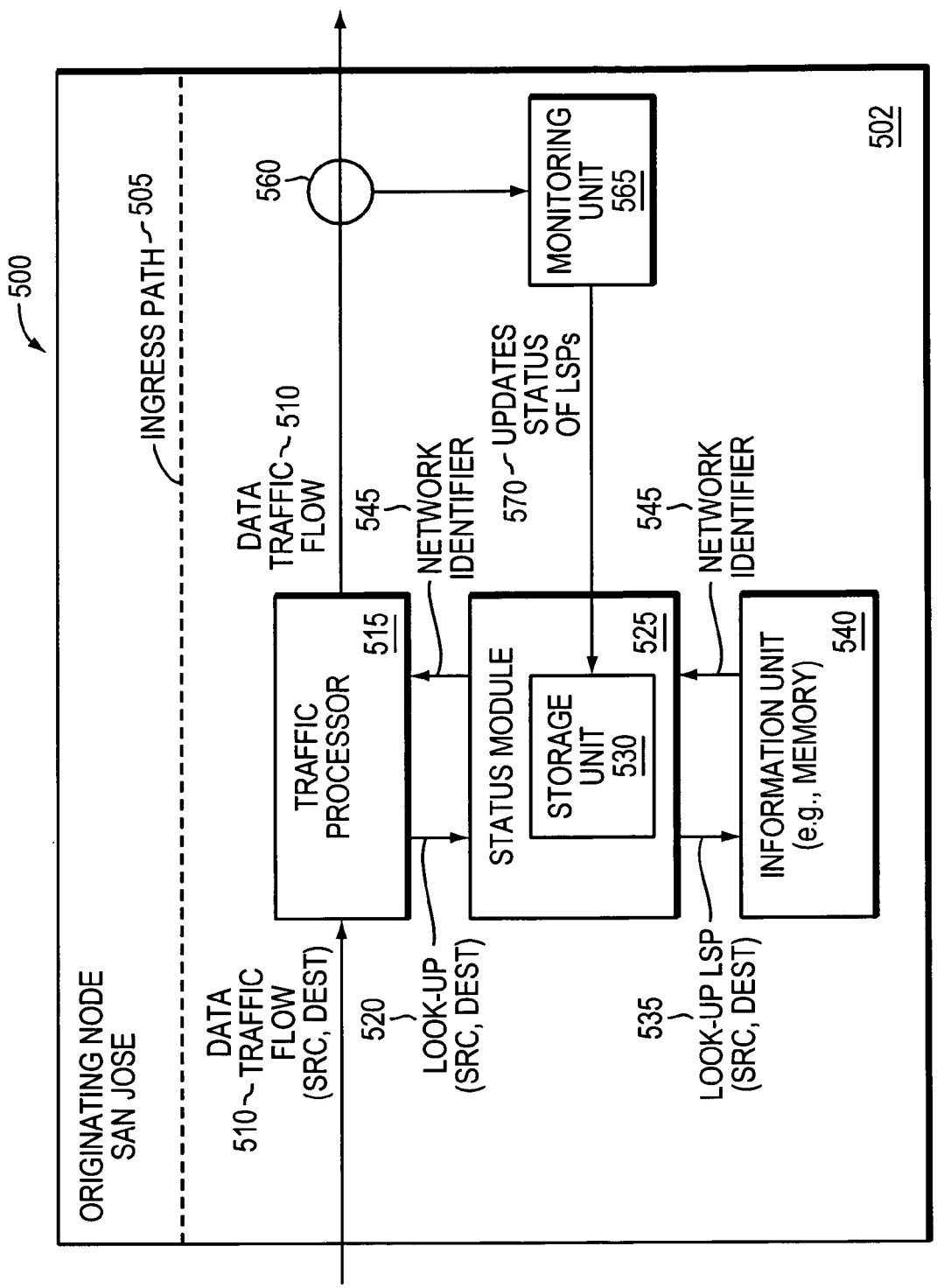
FIG. 5A is a schematic diagram depicting processing data traffic flow using an embodiment of the present invention.

FIG. 5A is a schematic diagram 500 depicting an example embodiment of the present invention determining an available LSP network identifier 545. An originating node 502 has an ingress path 505 in which a data traffic flow 510 is received. The data traffic flow 510 contains both source (src) and destination (dest) information. A traffic processor 515 receives the data traffic flow 510 and uses the source and destination information to perform a look-up 520. In particular, a look-up 520 may access a storage unit 530 of a status module 525. The look-up 520 may determine whether the source and destination of the data traffic flow 510 are valid. Stated differently, a determination is made as to whether the LSP relating to the source and destination is available for transmission. If there is an available LSP for transmission, the status module 525 performs a look-up 535 of the LSP in an information unit 540. The LSP look-up 535 provides a network identifier 545 of the LSP based on the source and destination. This network identifier 545 is returned to the status module 525. The status module 525, in turn, sends the network identifier 545 to the traffic processor 515. Once the traffic processor 515 receives the network identifier 545, the data traffic flow 510 is sent to the appropriate network links 560 based on the network identifier 545.

Referring back to the storage unit 530, the storage unit 530 contains the operational status for each LSP available to the traffic processor 515. A monitoring unit 565 monitors the network links 560 to determine the status of each LSP on an on going basis. Once the status of each LSP is determined, the monitoring unit 565 updates the status of the corresponding LSP 570 in the storage unit 530. In this way, the traffic processor 515 is determine available LSPs in real-time.

Figure 5B:
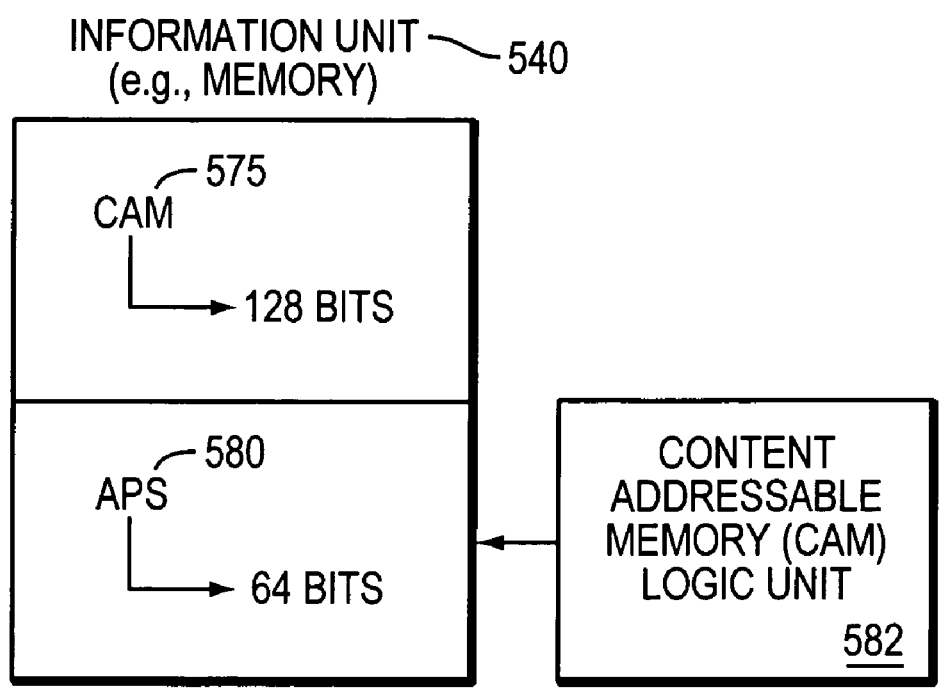
FIG. 5B is an exploded view of an information unit used to process data flow traffic.

FIG. 5B is an exploded view of an information unit 540. Each information unit 540 (e.g., memory) may contain 192 bits. The information unit 540 may be divided into two memory sections 575, 580. The first memory section 575 may be a Content-Addressable Memory (CAM) 575 that supports data having a length of 128 bits. This CAM 575 may be a CAM Static Random Access Memory (SRAM). Further, data stored in the CAM 575 may include data forwarding and classification information. The second memory section 580 may be an Automatic Protection Switching (APS) memory 580 that supports data having a length of 64 bits. This APS memory 580 may also be a SRAM type of memory. It should be understood that other forms of memory, such as Dynamic Ram (DRAM) may be employed in some embodiments. The APS memory 580 may store network identifier information relating to LSPs. In addition, the APS memory 580 data may also interact with a CAM logic unit 582. The CAM logic unit 582 may perform look-ups using the APS memory 580 to determine whether an available LSP address is valid. If the available LSP address is valid, the CAM logic unit 582 notifies the status module 525 (FIG. 5A).

Figure 6:
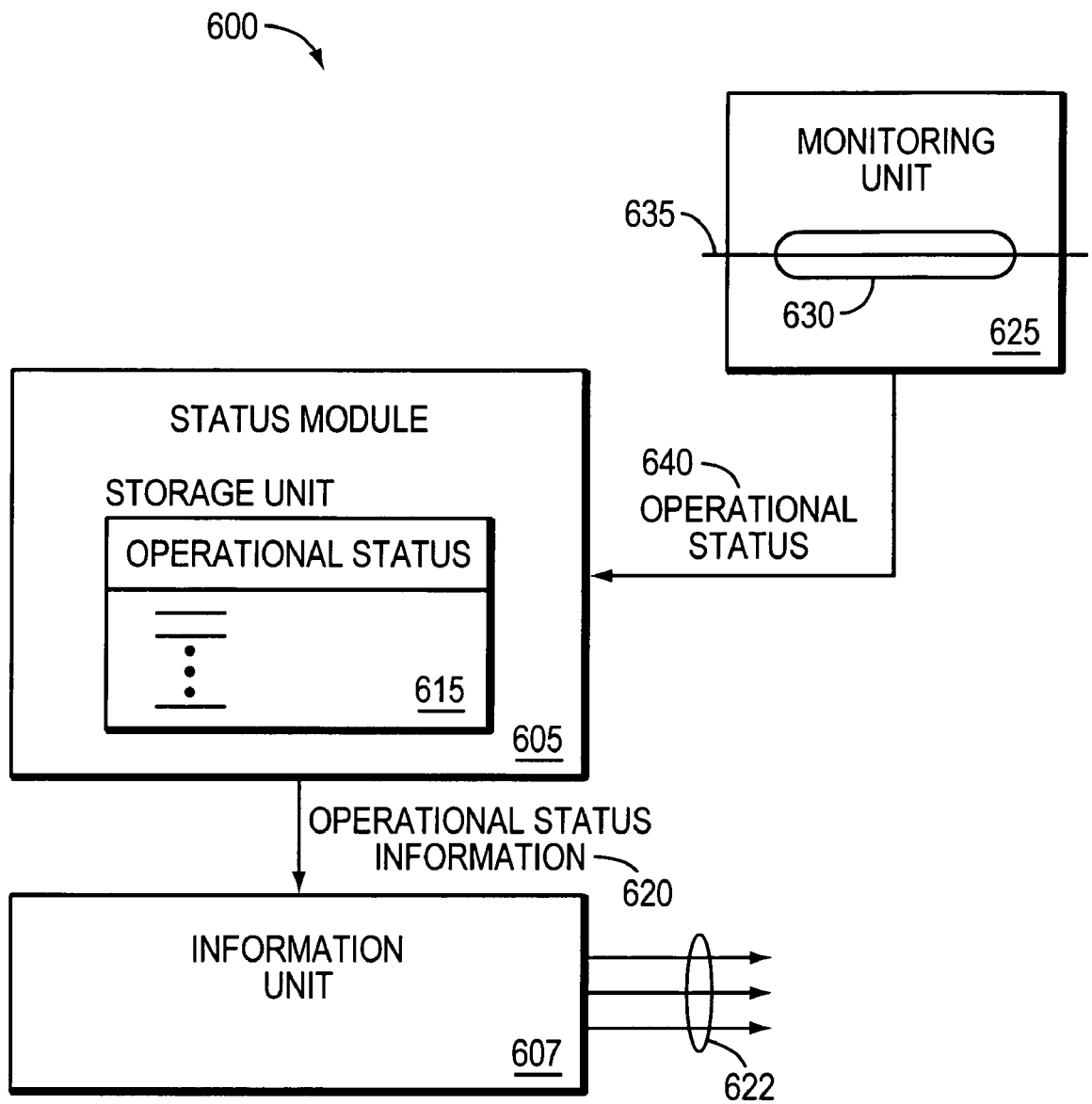
FIG. 6 is a block diagram of a monitoring unit communicating with a status module.

FIG. 6 is a block diagram 600 of a monitoring unit 625 communicating with a status module 605. The monitoring unit 625 monitors 630 an operational status 640 of network links 635 to detect a change in the operational status 640. Upon detecting a change in the operational status 640, the monitoring unit 625 sends the updated operational status 640 to the status module 605. Alternatively, the status module 605 may retrieve the operational status 640 from the monitoring unit 625. Regardless of how the status module 605 obtains the operational status 640, the status module 605 stores the operational status in a storage unit 615 in this embodiment. This storage unit 615 may be updated continuously or continually on an ongoing basis. Next, the status module 615 sends the operational status information 620 to an information unit 607. This operation status information 620 is used to service traffic via the network links 622 in order to maintain network connectivity via the LSP(s). It is useful to note that the operational status information 640 may be related to a primary LSP, secondary LSP(s), or both.

Figure 7:
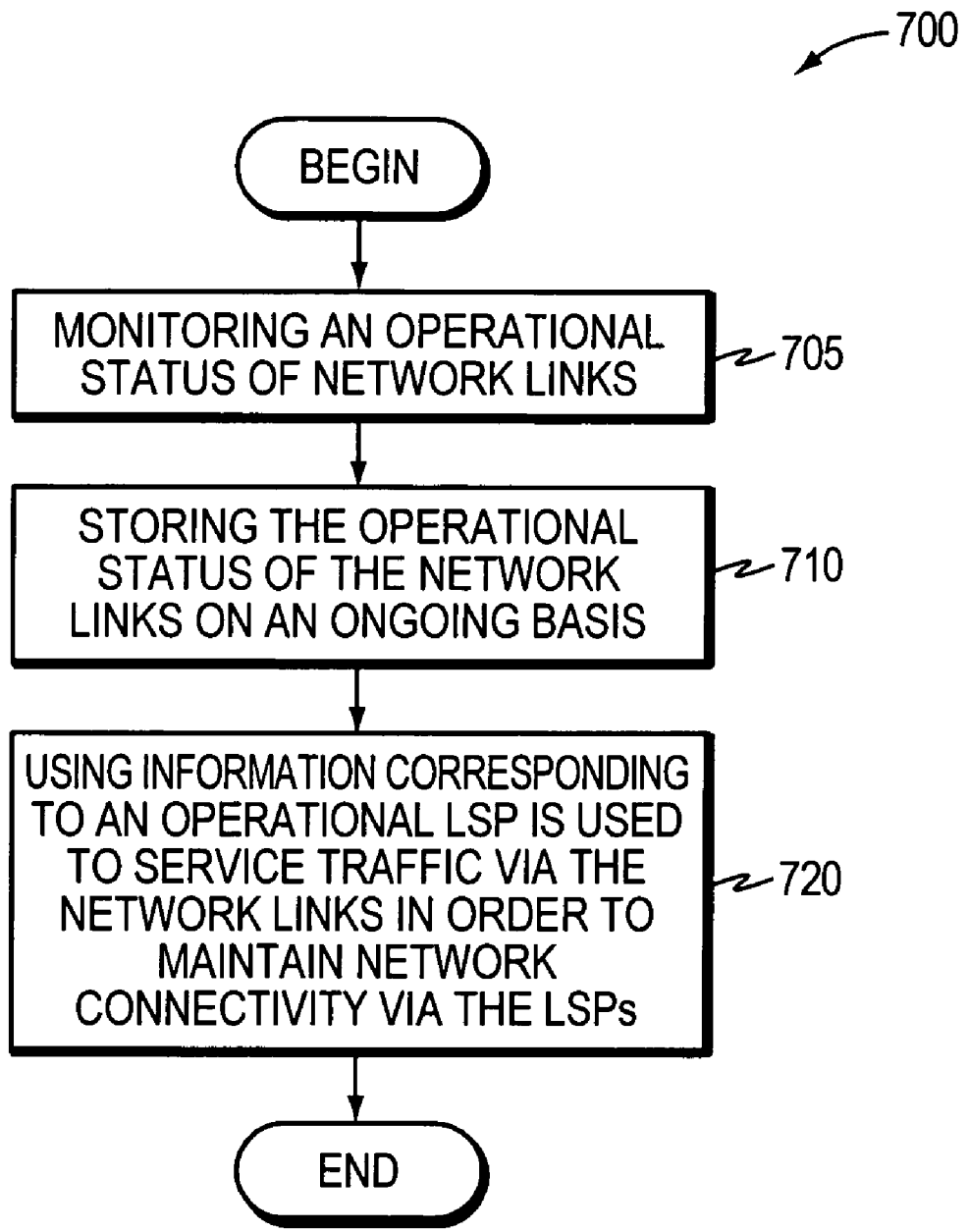
FIG. 7 is a flow diagram corresponding to maintaining network connectivity.

FIG. 7 is a flow diagram 700 corresponding to maintaining network connectivity. After beginning, the embodiment monitors an operational status of network links (705). Next, the operational status of the network links is stored on an ongoing basis (710). The operational status, corresponding to an operational LSP, is used to service traffic via the network links in order to maintain network connectivity via the LSPs (720).

Figure 8:
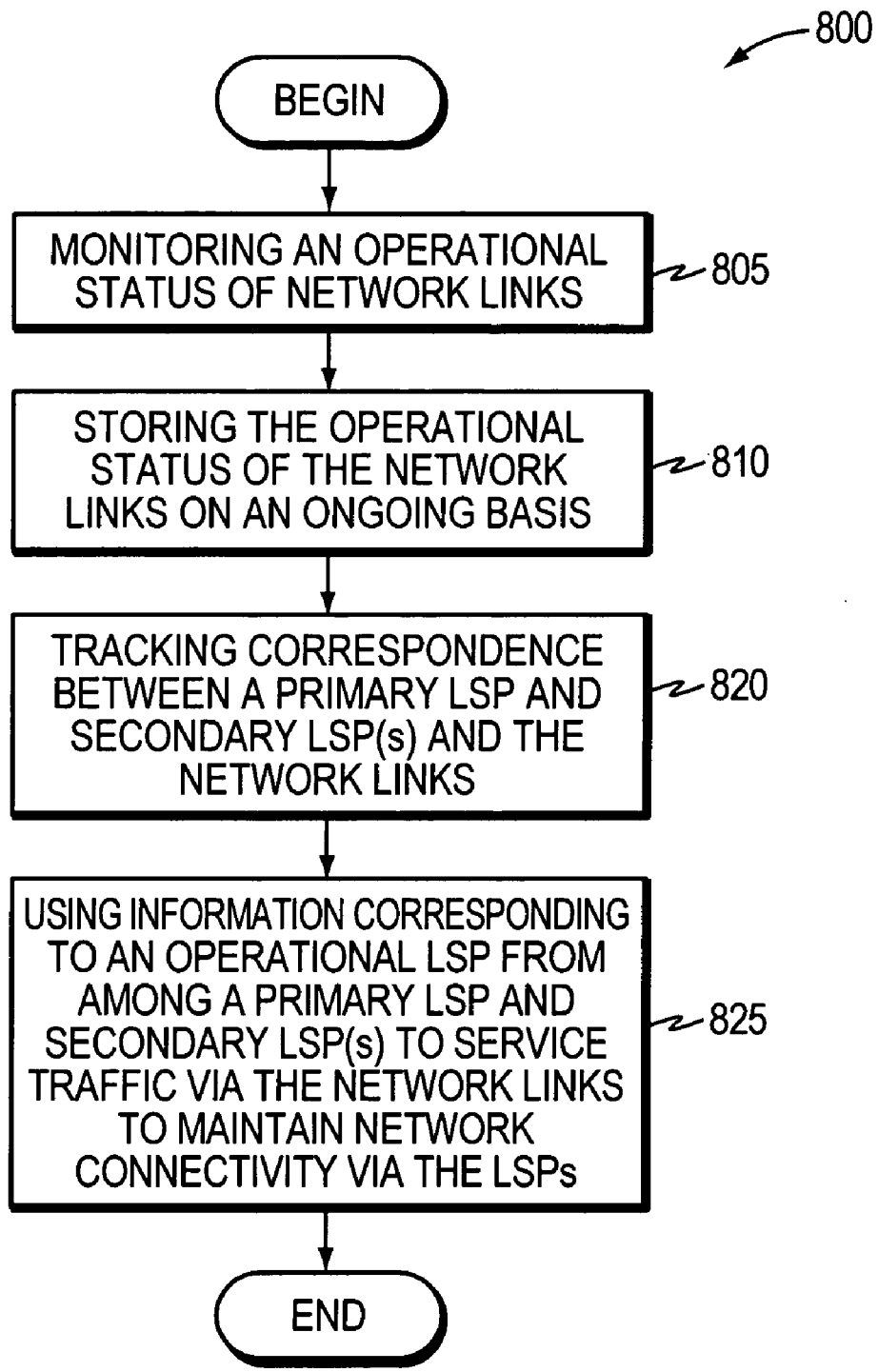
FIG. 8 is a flow diagram corresponding to maintaining network connectivity.

FIG. 8 is a flow diagram 800 corresponding to maintaining network connectivity. After beginning, the embodiment monitors an operational status of network links (805). The operational status of the network links is stored on an ongoing basis (810), where the operational status corresponds to an operational LSP from among a primary LSP and secondary LSP(s). Next, tracking of this correspondence between the primary LSP, secondary LSP(s), and network links is performed (820). Finally, the traffic is serviced via the network links to maintain network connectivity via the operational LSP using the information corresponding to the operational LSP (825).

Figure 9:
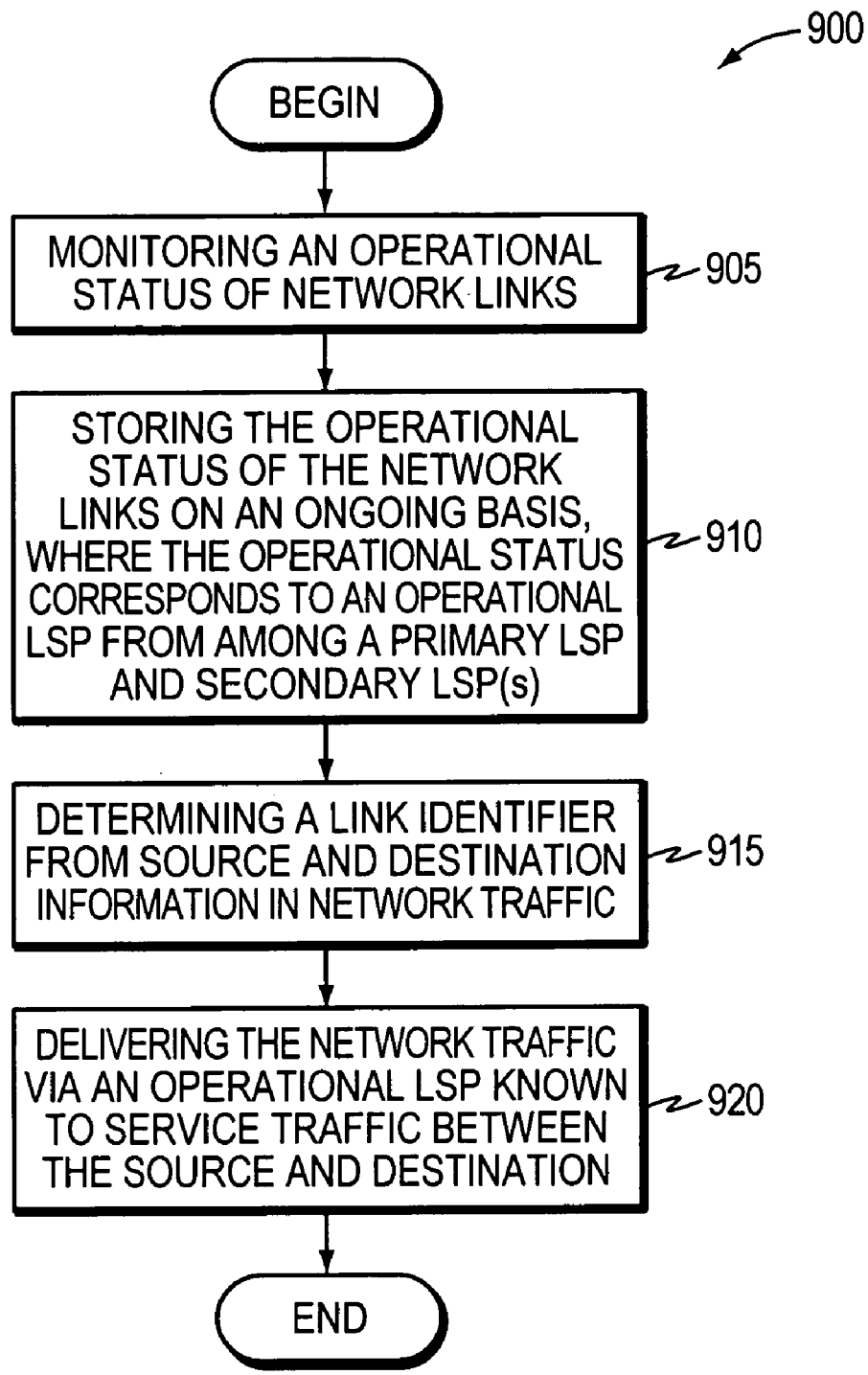
FIG. 9 is a flow diagram corresponding to maintaining network connectivity.

FIG. 9 is a flow diagram 900 corresponding to maintaining network connectivity. After beginning, the embodiment monitors an operational status of network links (905). The operational status of the network links is stored on an ongoing basis where the operational status corresponds to an operational LSP from among a primary LSP and secondary LSP(s) (910). Next, a link identifier is determined from a source and destination information in the network traffic (915). Finally, the network traffic is delivered, using the link identifier, via an operational LSP known to service traffic between the source and destination (920).

It should be understood that any of the embodiments disclosed herein, such as the look-ups or the flow diagrams of FIGS. 7, 8, and 9, may be implemented in the form of hardware, firmware, or software. If implemented in software, the software may be processor instructions in any suitable software language and stored on any form of computer readable medium. The processor instructions are loaded and executed by a processor, such as a general purpose or application specific processor that, in turn, performs the example embodiments disclosed herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method for maintaining network connectivity via Label Switched Paths (LSPs), comprising:

monitoring an operational status of a primary LSP and at least one secondary LSP at an egress side of a network node coupled to network links supporting the primary LSP and at least one secondary LSP;

feeding back and storing the operational status of the primary LSP and the at least one secondary LSP supported by the network links on an ongoing basis in operational association with stored source and destination addresses used at least to determine whether source and destination addresses of traffic are valid; and using stored operational status of the primary LSP and the at least one secondary LSP in combination with the stored source and destination addresses at the network node to service traffic via the network links to maintain network connectivity via the LSPs.

2. The method of claim 1 wherein the LSPs are Fast Re-route (FRR) enabled.

3. The method of claim 1 wherein storing the operational status is performed within 50 msec to enable switchover within 50 msec regardless of the number of LSPs.

4. The method of claim 1 wherein the at least one secondary LSP is a bypass LSP or a backup LSP.

5. The method of claim 1 further comprising:
tracking correspondence between a primary LSP, at least one secondary LSP, and the network links.

6. The method of claim 1 further comprising accessing memory for traffic forwarding, classification, and network link operational status information.

7. The method of claim 1 further comprising:
accessing a first memory containing forwarding and classification information; and
accessing a second memory containing network link operational status information.

8. The method of claim 1 further comprising:
determining a link identifier from source and destination information in network traffic to deliver the network traffic via an operational LSP known to service traffic between the source and destination.

9. The method of claim 1 further including automatically updating the operational status on an ongoing basis.

10. The method of claim 1 further including retrieving the operational status on an ongoing basis.

11. An apparatus for maintaining network connectivity via Label Switched Paths (LSPs), comprising:
a monitoring unit configured to monitor an operational status of a primary LSP and at least one secondary LSP at an egress side of a network node coupled to network links supporting the primary LSP and at least one secondary LSP;
a status module, including a storage unit, configured to receive feedback and store the operational status of the primary LSP and the at least one secondary LSP supported by the network links on an ongoing basis in operational association with stored source and destination addresses used at least to determine whether source and destination addresses of traffic are valid; and
an information unit configured to use stored operational status of the primary LSP and the at least one secondary LSP in combination with the stored source and destination addresses at the network node to service traffic via the network links to maintain network connectivity via the LSPs.

12. The apparatus of claim 11 wherein the LSPs are Fast Re-route (FRR) enabled.

13. The apparatus of claim 11 wherein the storage unit is configured to store the operational status within 50 msec to enable switchover within 50 msec regardless of the number of LSPs.

14. The apparatus of claim 11 wherein the at least one secondary LSP is a bypass LSP or a backup LSP.

15. The apparatus of claim 11 wherein:
the status module is further configured to track correspondence between a primary LSP, at least one secondary LSP, and the network links.

16. The apparatus of claim 11 wherein the status module is configured to access memory to determine traffic forwarding, classification, and network link operational status information.

17. The apparatus of claim 11 further comprising:
a first memory containing forwarding and classification information; and
a second memory containing network link operational status information.

18. The apparatus of claim 11 further including a traffic processor configured to determine a link identifier from source and destination information in network traffic to deliver the network traffic via an operational LSP known to service traffic between the source and destination.

19. The apparatus of claim 11 wherein the status module is further configured to update the operational status on an ongoing basis in an automated manner.

20. The apparatus of claim 11 wherein the status module is further configured to retrieve the operational status on an ongoing basis.

* * * * *